UNITED STATES PATENT OFFICE.

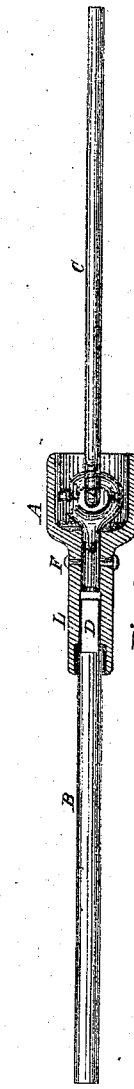

JAMES VALLELEY AND FRANKLIN A. WISE, OF CANTON, OHIO.

IMPROVEMENT IN SAFETY-SHAFT COUPLINGS.

Specification forming part of Letters Patent No. 117,700, dated August 1, 1871.

*To all whom it may concern:*

Be it known that we, JAMES VALLELEY and FRANKLIN A. WISE, both of Canton, Stark county, Ohio, have invented certain Improvements in Safety-Shaft Couplings; and that the following is a full, clear, and exact specification thereof, which will enable others skilled in the art to make and use the said invention.

Our invention relates particularly to couplings for rotating shafts, which are placed at angles with each other, although it may be used for any line shafting; and it consists in the construction of a coupling-sleeve having a neck with an angular-shaped cavity for the angular end of one main shaft, and having a short hook or eye-coupling shaft secured in it, and coupled in the inside of the sleeve with a hook or eye on the end of the other main shaft, said coupling-sleeve also having a stop-pin or "carrier" on its inner surface, which forms a bearing for the coupling-hooks or eyes, and serves to take up the torsional strain which would otherwise be thrown wholly on the short coupling-shaft, and the whole forming a cheap and strong universal coupling, in which the parts are all inclosed in the sleeve so as to insure the safety of persons or horses working around it when the coupled shafts are in rapid rotation, as in the case of thrashing-machines driven by shafting with the ordinary horse-power.

In the accompanying drawing, Figure 1 is a perspective view of an application of our improved coupling. Fig. 2 is a sectional view of the same. Figs. 3 are views of two modifications of the short coupling-shaft, showing its attachment on one main shaft. Figs. 4 are side and end views of the other main shaft. Figs. 5 and 6 are transverse sections and end views of the coupling-sleeve.

The coupling-sleeve A is ordinarily made of cast-iron, in the general form shown, and its neck L has formed in it the cylindrical hole $b$ of a diameter equal to that of the main shaft B, and an angular hole, $d$, either square or of other equivalent angular section, and of somewhat less size than the hole $b$, as shown in Fig. 5. The coupling-shaft E is made either with a closed eye, H, as shown in Fig. 2, and lower view in Fig. 3, or with a hook, H', as shown in upper view in Fig. 3, and its end is secured in the hole $e$ in the neck L of the coupling-sleeve by means of a rivet, F, inserted through a hole, $a$, in the coupling-sleeve, and a corresponding hole in the coupling-shaft E, as shown in Fig. 2. An eye, K, is formed on the end of the main shaft C, and the eye H or hook H' on the coupling-shaft E is secured in said eye, as shown in Figs. 3, the length of the shaft E being such as to bring the eyes K and H within the sleeve A, as shown in Fig. 2, so as to inclose all the engaging parts. The end of the main shaft B is made with an angular end, D, of the same section as the hole $d$ in the coupling-neck L, and the shaft B is simply inserted in the coupling-sleeve, as shown in Figs. 1 and 2.

It is evident that the construction described would, when arranged and connected as shown, form a complete working coupling; but in order to avoid throwing all the torsional strain on the coupling-shaft E and rivet F, the stop-pin or carrier G is cast or otherwise secured in the inside of the sleeve A, as shown in Figs. 2 and 5, and is of such size as to fit in the angle formed by the eyes H and K, as shown in Fig. 6, from which it is evident that the power can be transferred from the shaft B to the coupling-sleeve L A, and from that by the carrier G, through the interlocked eyes H K, to the shaft C, without depending on the shaft E or rivet F for anything except the holding of the parts together. The general appearance of the coupling when in use in shown in Fig. 1, from which it will be seen that there are no projecting angles to catch the clothing of the operators, nor are there any holes in which a person could step or be caught; and it will be seen from Figs. 1 and 2 that this construction allows the main shafts to work at any angle with each other which would be likely to occur in practice.

What we claim as our invention, and desire to secure by Letters Patent, is—

1. The coupling-sleeve A L having the angular cavity $d$ therein, and the short coupling-shaft E secured in the sleeve A L by the rivet F or its equivalent, and having an eye, H, or hook H', when used in combination with the shaft B having the angular end D, and the shaft C having an eye, K, or a hook at its end, the several parts being arranged and operating substantially as is herein specified.

2. The stop-pin or carrier G, secured in the inside of the sleeve A L, and fitting in the angle formed by the eyes H and K, or equivalent hooks on the coupling-shaft E, and main shaft C, substantially as and for the purpose specified.

3. The combination of the main shaft B with angular end D, coupling-sleeve L A with angular cavity $d$ and carrier G, coupling-shaft E with eye H or hook H', and main shaft C with eye or hook K, the several parts being arranged and operating substantially as and for the purpose herein specified.

As evidence of the foregoing witness our hands this 5th day of June, 1871.

JAMES VALLELEY.
F. A. WISE.

Witnesses:
JOB ABBOTT,
ANDREW CHOFFIN.